(12) United States Patent
Nakanishi et al.

(10) Patent No.: US 8,744,226 B2
(45) Date of Patent: Jun. 3, 2014

(54) METHOD OF MANUFACTURING OPTICAL FIBER AND OPTICAL FIBER

(75) Inventors: Tetsuya Nakanishi, Yokohama (JP); Tatsuya Konishi, Yokohama (JP); Takashi Fujii, Yokohama (JP); Takashi Takada, Yokohama (JP); Kumiko Tachibana, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/605,215

(22) Filed: Sep. 6, 2012

(65) Prior Publication Data

US 2013/0064516 A1 Mar. 14, 2013

(30) Foreign Application Priority Data

Sep. 13, 2011 (JP) ................................. 2011-199541

(51) Int. Cl.
*G02B 6/00* (2006.01)
*G02B 6/36* (2006.01)

(52) U.S. Cl.
USPC .......................................... 385/128; 385/122

(58) Field of Classification Search
USPC ................................. 385/122, 128
See application file for complete search history.

(56) References Cited

U.S. PATENT DOCUMENTS 5,181,269 A 1/1993 Petisce

FOREIGN PATENT DOCUMENTS

| JP | 6-250053 | 9/1994 |
| JP | 2005-55779 | 3/2005 |
| JP | 2006-215445 | 8/2006 |

OTHER PUBLICATIONS

Willem Griffioen et al., "Reliability of Bend Insensitive Fibers," Proceedings of the 58th IWCS/IICIT, 2009, pp. 251-257.

*Primary Examiner* — Charlie Peng
*Assistant Examiner* — Mary El Shammaa
(74) *Attorney, Agent, or Firm* — Drinker Biddle & Reath LLP

(57) ABSTRACT

A method of manufacturing an optical fiber includes a first step of drawing an optical fiber preform into a glass fiber and disposing a fiber coating on the outer circumference of the glass fiber to form a parent optical fiber; a second step of cutting the parent optical fiber into a plurality of individual optical fibers; a third step of determining, at, at least, one spot of the parent optical fiber, a failure strength F1 and a failure time T; a fourth step of determining a failure strength F2 of each of the individual optical fibers; and a fifth step of selecting an optical fiber having a failure strength F2 of 5.5 kgf or more from the individual optical fibers cut from the parent optical fiber whose failure strength F1 and failure time T satisfy the inequality $T > 2.6 \times 10^{-11} \times \exp(4.736 \times F1)$.

16 Claims, 4 Drawing Sheets

METHOD OF MANUFACTURING OPTICAL FIBER AND OPTICAL FIBER

BACKGROUND OF THE INVENTION

1. Field of the Invention

The present invention relates to a method of manufacturing an optical fiber, and to an optical fiber.

2. Description of the Related Art

In optical fibers generally used in optical transmission systems, it is necessary to guarantee long-term mechanical reliability, for example, for 20 years, in the usage environment. Therefore, mechanical reliability (lifetime and failure probability) is calculated for an optical fiber based on the measured fatigue coefficient and screening strength of the optical fiber and strain to be applied to the optical fiber in the usage environment. In order to evaluate the mechanical reliability, the value of static fatigue coefficient or dynamic fatigue coefficient, screening strength, and failure frequency are mainly used, whereas failure time and failure strength are not used.

In recent years, since fiber-to-the-home (FTTH) networks have been developed, installation of optical fiber transmission lines for access systems has been increasing. In access systems, it is difficult for communication carriers to control installation. Furthermore, there have been increased chances for users to handle optical fibers in their premises or the like. In such access systems or premises, there is a concern that optical fibers may be kinked or stepped on during installation and handling, and thus excessive strain may be temporarily applied to optical fibers.

As described in W. Griffioen, et al, "Reliability of Bend Insensitive Fibers," Proceedings of the 58th IWCS/IICIT, pp. 251-257 (2009), it is known that in the case where an optical fiber is bent around a small radius (e.g., with a bending radius of 2.4 mm or less), the intrinsic strength of the glass of the optical fiber influences the failure probability. However, an optical fiber whose failure time is guaranteed when it is bent around a small radius, and a method of manufacturing the same are not known.

Japanese Unexamined Patent Application Publication Nos. 6-250053 and 2005-55779 each describe that, by controlling the pH of a fiber coating, the fatigue coefficient of the optical fiber can be improved. However, the fatigue coefficient cannot always be improved by controlling only the pH. Furthermore, failure strength and failure time at the time of being bent around a small radius are not examined in these documents.

Japanese Unexamined Patent Application Publication No. 2006-215445 describes that, by setting the tetraethoxysilane content to be 0.1 parts by mass to 3.0 parts by mass and the diethylamine content to be 0.001 parts by mass to 0.2 parts by mass in a primary coating which is a part of a fiber coating and is in contact with the outer circumference of a glass fiber, it is possible to prevent a reduction in strength of the glass fiber in the process of cleaning the surface of the glass fiber after the fiber coating has been removed. However, by adding an amine-based additive, such as diethylamine, to the primary coating, the basicity of the photo-cured primary coating is increased, and as a result, long-term reliability of the optical fiber is rather decreased. Furthermore, failure strength and failure time at the time of being bent around a small radius are not examined in this document.

As described above, there has not been a sufficient accumulation of knowledge on failure time when optical fibers are bent around an excessively small radius. An optical fiber whose failure time is guaranteed at the time of being bent around a small radius or a method of manufacturing the same is not known. Furthermore, failure strength and failure time at the time of being bent around a small radius have not been examined.

SUMMARY OF THE INVENTION

It is an object of the present invention to provide an optical fiber which does not reach failure even when it is temporarily bent around a small radius, and a method of manufacturing such an optical fiber.

A method of manufacturing an optical fiber according to the present invention, which is a method of manufacturing an optical fiber having a fiber coating on the outer circumference of a glass fiber, includes (1) a first step of drawing an optical fiber preform into a glass fiber and disposing a fiber coating on the outer circumference of the glass fiber to form a parent optical fiber, (2) a second step of cutting the parent optical fiber into a plurality of individual optical fibers, (3) a third step of determining, at, at least, one spot of the parent optical fiber, a failure strength F1, which is a tension at which the parent optical fiber fails when the tension of the parent optical fiber is increased at a tensile testing speed of 1%/min, and a failure time T, which is a period of time until the parent optical fiber wound on a mandrel with a radius of 1.3 mm fails, (4) a fourth step of determining a failure strength F2 of each of the plurality of individual optical fibers, and (5) a fifth step of selecting an optical fiber having a failure strength F2 of 5.5 kgf or more from the individual optical fibers cut from the parent optical fiber whose failure strength F1 [kgf] and failure time T [min] satisfy the inequality $T > 2.6 \times 10^{-11} \times \exp(4.736 \times F1)$.

In the method of manufacturing an optical fiber according to the present invention, preferably, the OH concentration of the optical fiber preform in a region extending from the outer circumference of the optical fiber preform inward to an inside diameter of $0.98 D1$, where $D1$ is the outside diameter of the optical fiber preform, is 10 ppm to 10,000 ppm by weight, and a resin for forming a primary coating which is a part of the fiber coating and is in contact with the outer circumference of the glass fiber, before being photo-cured, has a moisture content of 50 ppm to 20,000 ppm by weight, and a pH of 7 or less. In the third step, preferably, the rate of decrease in the amount of an unreacted silane coupling agent contained in the primary coating is less than 0.1/7 days.

In the method of manufacturing an optical fiber according to the present invention, preferably, a resin for forming the primary coating, before being photo-cured, contains 0.1% to 10% by weight of unreactive tetraethoxysilane to which an oligomer is not added and 0.001% by weight or less of an amine-based additive. More preferably, the resin for forming the primary coating, before being photo-cured, contains 0.3% to 2% by weight of unreactive tetraethoxysilane to which an oligomer is not added.

In the method of manufacturing an optical fiber according to the present invention, preferably, the primary coating, after being photo-cured, has an elongation stress at failure of 1.5 MPa or more. Preferably, a resin for forming the primary coating, before being photo-cured, contains 5% to 15% by weight of an N-vinyl monomer; and after being photo-cured, the primary coating has a Young's modulus of 0.2 MPa to 1 MPa, and a secondary coating surrounding the primary coating has a Young's modulus of 800 MPa or more.

An optical fiber according to the present invention includes a fiber coating disposed on the outer circumference of a glass fiber, in which the OH concentration of the glass fiber in a region extending from the outer circumference of the glass fiber inward to an inside diameter of 0.95 dl, where dl is the outside diameter of the glass fiber, is 10 ppm to 1,000 ppm by weight, and a failure strength F [kgf], which is a tension at which the optical fiber fails when the tension is increased at a tensile testing speed of 1%/min, and a failure time T [min], which is a period of time until the optical fiber wound on a mandrel with a radius of 1.3 mm fails, satisfy the inequalities $T>2.6\times10^{-11}\times\exp(4.736\times F)$ and $F>5.5$.

In the optical fiber according to the present invention, preferably, a resin for forming the primary coating has a moisture content of 50 ppm to 20,000 ppm by weight before being photo-cured, and a pH of 5 or less after being photo-cured. Preferably, the rate of decrease in the amount of an unreacted silane coupling agent contained in the primary coating is less than 0.1/7 days.

In the optical fiber according to the present invention, preferably, the primary coating, after being photo-cured, has an elongation stress at failure of 1.5 MPa or more. Preferably, the primary coating, after being photo-cured, has a gel fraction in the range of 80% to 95%. Preferably, the outside diameter of the fiber coating is 210 μm or less, and the thickness of a secondary coating is 10 μm or more. Preferably, the dynamic fatigue coefficient is 20 or more. Furthermore, preferably, compressive stress is imparted to the outer circumference.

According to the present invention, even when an optical fiber is temporarily bent around a small radius, failure of the optical fiber can be prevented.

DESCRIPTION OF THE PREFERRED EMBODIMENTS

Figure 1:
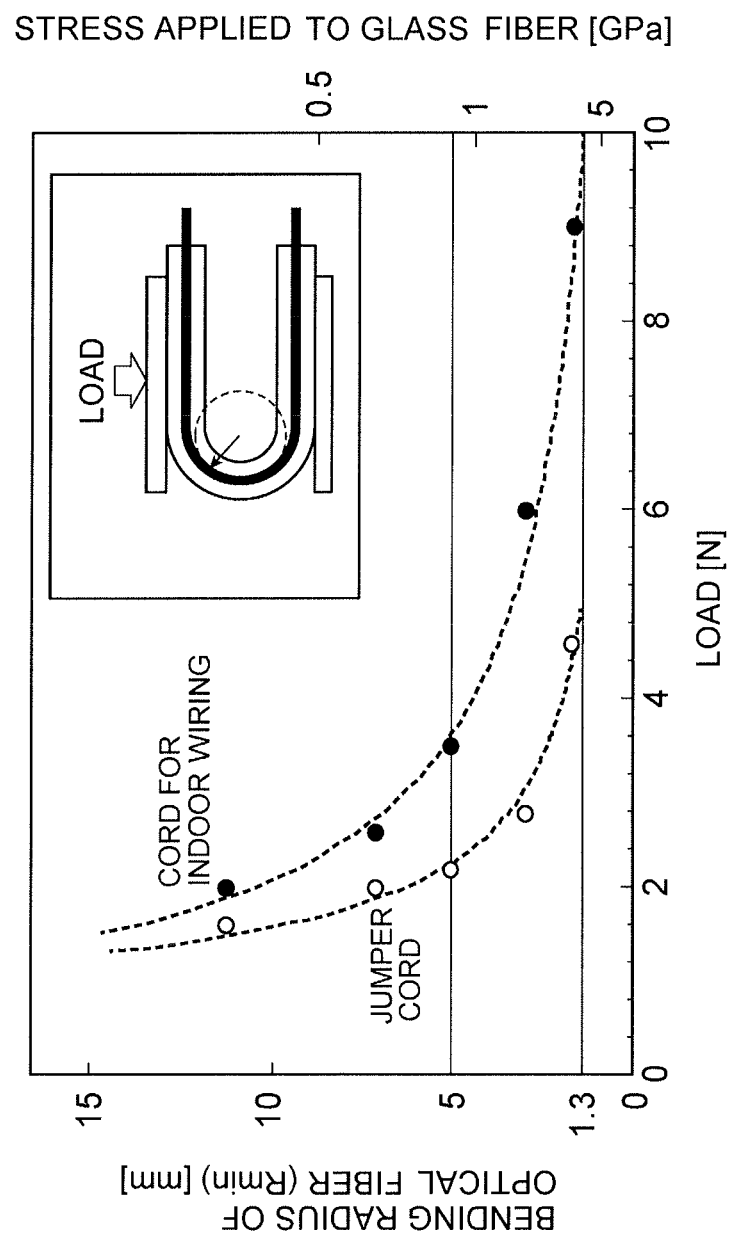
FIG. 1 is a graph showing the relationship between the load and the bending radius of a jumper cord and a cord for indoor wiring, each having an outside diameter of 3 mm.

Embodiments of the present invention will be described below with reference to the drawings. The drawings are for illustrative purposes only, and the invention is not limited to the drawings. In the drawings, the same components are designated by the identical reference numerals, and duplicate descriptions are omitted. In the drawings, dimensions are not necessarily accurate.

As general purpose cords for indoor wiring, optical cords with an outside diameter of 4.8 mm or 3.0 mm are suitably used. FIG. 1 is a graph showing the relationship between the load and the bending radius, which are obtained by conducting a crush test (including U-shaped bend) on each of a generally used jumper cord and a cord for indoor wiring with an outside diameter of 3 mm which is easily bent around a small radius. The cord for indoor wiring has higher rigidity than the jumper cord. However, in both of them, as the load increases, the internal radius at the bend position (U-shaped end) decreases, and the minimum radius R of the optical fiber inside the optical cord when the upper cord and the lower cord are in contact with each other is 1.3 mm. As is obvious from the graph, there is a concern that a temporary bending strain with a radius of curvature of up to 1.3 mm may be applied to the optical fiber during installation and handling.

Figure 2:
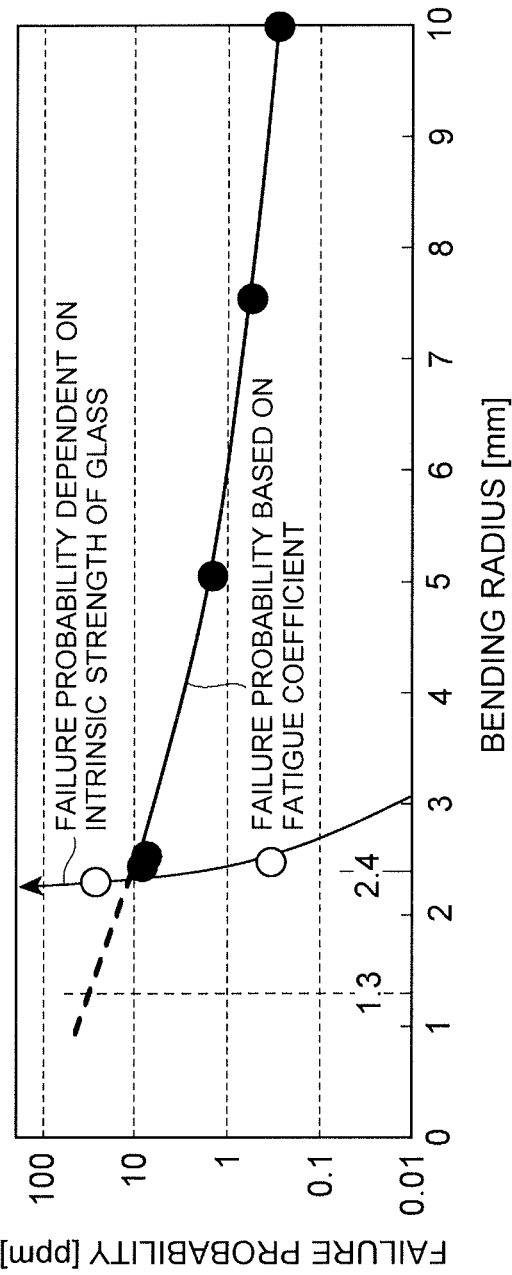
FIG. 2 is graph showing the relationship between the bending radius and the failure probability of optical fibers.

FIG. 2 is a graph showing the relationship between the bending radius and the failure probability of optical fibers. As shown in FIG. 2, in the case where an optical fiber is bent around a small radius, for example, with a bending radius of 2.4 mm or less, the failure dependent on intrinsic strength of glass dominates rather than the failure due to expansion of surface flaws defined by the fatigue coefficient.

It is empirically known that failure of an optical fiber when it is bent around a small radius occurs instantaneously or within a few minutes. A method for determining the failure time is not known, and there has been a demand for a method of stably supplying an optical fiber that can withstand a temporary excessive strain. The optical fiber and the method for manufacturing an optical fiber according to the present invention can meet such a demand, and even in the case where an excessive bending strain is applied to the optical fiber, the optical fiber does not fail and can withstand the strain until the strain is relieved.

Figure 3:
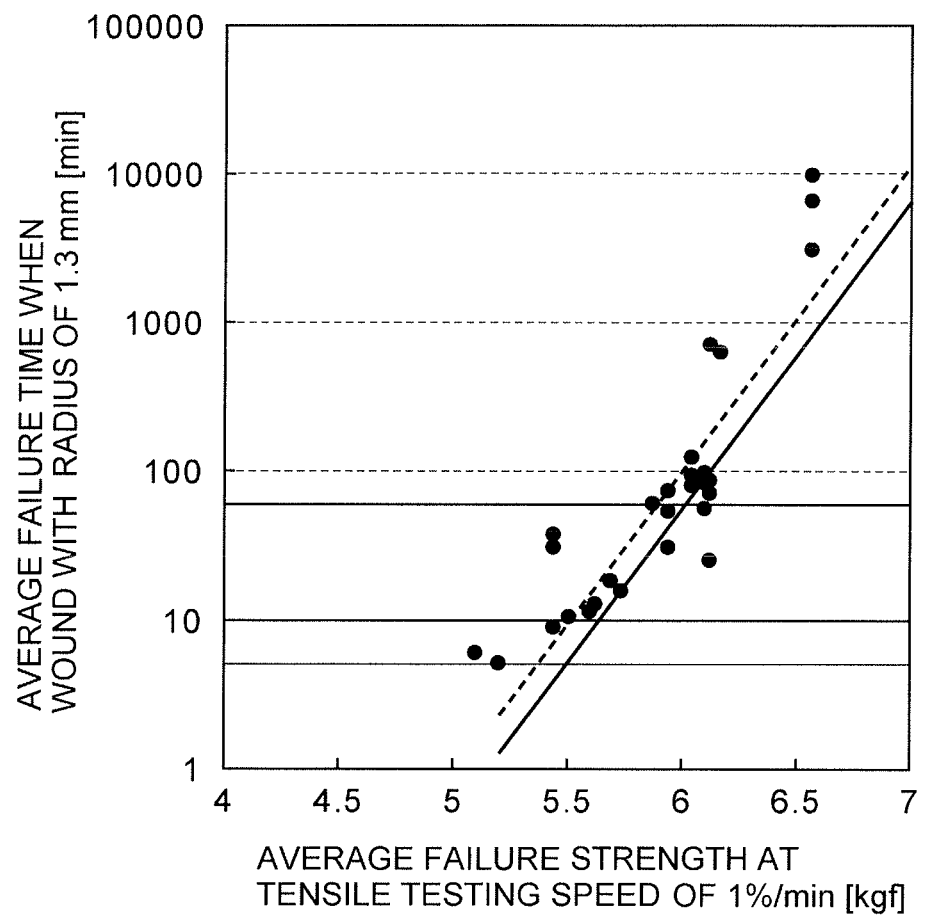
FIG. 3 is a graph showing the relationship between the average failure strength and the average failure time of optical fibers.

The present inventors have found that, in the case where fiber coatings of optical fibers have the same resin composition, the failure time of a region of an optical fiber to which a large strain with a radius of curvature of 2.4 mm or less is applied correlates with the tensile failure strength of the optical fiber. FIG. 3 is a graph showing the relationship between the average failure strength and the average failure time of optical fibers. In this case, 28 optical fiber preforms were drawn to form optical fibers. The failure strength (i.e., tension at which the optical fiber fails when the tension of optical fiber is increased at a tensile testing speed of 1%/min) and the failure time (i.e., period of time until the optical fiber wound on a mandrel with a radius of 1.3 mm fails) of the optical fibers were measured, and the average failure strength and average time of 15 measured values were calculated for each preform.

As shown in FIG. 3, the average failure strength and the average failure time clearly correlate with each other. The relationship between the two can be generally expressed by the equation (1):

$$T>A\times\exp(B\times F1) \quad (1)$$

where F1 is the average failure strength [kgf], T is the average failure time [min], and A and B are factors.

When it is possible to obtain an optical fiber having a failure time of 5 minutes or more at the time of being bent around a small radius, it is assumed that even when the optical fiber is temporarily bent around a small radius, for example, by being kinked or stepped on during installation and handling, failure can be avoided during that period. Furthermore, as is clear from FIG. 3, in order to obtain an optical fiber having a failure time of 5 minutes or more at a bending radius of 1.3 mm, the failure strength is required to be 5.5 kgf or more. As described above, a predetermined failure time can be guaranteed by determining the average failure strength and the average failure time of one or a plurality of preforms, confirming that the resulting values satisfy the relationship (equation (1)), and controlling the failure strength of the individual optical fibers.

In particular, by using an optical fiber (represented by the solid line in FIG. 3) which satisfies the inequality (2):

$$T>2.6\times10^{-11}\times\exp(4.736\times F1) \quad (2)$$

and has a failure strength of 5.5 kgf or more, a failure time of 5 minutes of more can be obtained even at a bending radius of 1.3 mm. Thus, it is possible to select and use optical fibers that do not fail until a temporary excessive bending strain is relieved.

A method of manufacturing an optical fiber according to the present invention, which is a method of manufacturing an optical fiber having a fiber coating on the outer circumference of a glass fiber, includes (1) a first step of drawing an optical fiber preform into a glass fiber and disposing a fiber coating on the outer circumference of the glass fiber to form a parent optical fiber, (2) a second step of cutting the parent optical fiber into a plurality of individual optical fibers, (3) a third step of determining the failure strength F1 and the failure time T, at, at least one spot of the parent optical fiber, (4) a fourth step of determining the failure strength F2 of each of the plurality of individual optical fibers, and (5) a fifth step of selecting an optical fiber having a failure strength F2 of 5.5 kgf or more from the individual optical fibers cut from the parent optical fiber whose failure strength F1 [kgf] and failure time T [min] satisfy the inequality (2).

Figure 4:
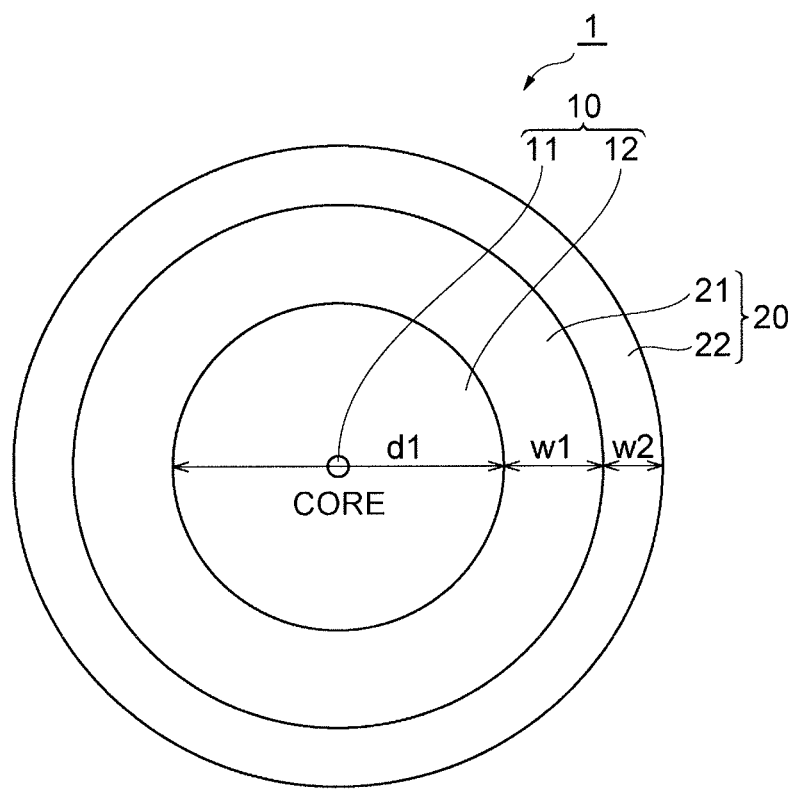
FIG. 4 is a cross-sectional view of an optical fiber according to an embodiment of the present invention.

FIG. 4 is a cross-sectional view of an optical fiber 1 according to an embodiment of the present invention. The optical fiber 1 includes a fiber coating 20 disposed on the outer circumference of a glass fiber 10. The glass fiber 10 includes a core 11 and a cladding 12. The fiber coating 20 includes a primary coating in contact with the outer circumference of the glass fiber and a secondary coating 22 surrounding the primary coating 21.

When the failure strength F2 of an optical fiber is 5.9 kgf or more at a tensile testing speed of 1%/min, a failure time of 30 minutes or more can be obtained even at a bending radius of 1.3 mm. When the failure strength F2 of an optical fiber is 6.0 kgf or more at a tensile testing speed of 1%/min, a failure time of 60 minutes or more can be obtained even at a bending radius of 1.3 mm. Furthermore, by using an optical fiber (represented by the broken line in FIG. 3) which satisfies the inequality (3):

$$T > 4.6 \times 10^{-11} \times \exp(4.736 \times F1) \quad (3)$$

and has a failure strength of 5.5 kgf or more, a failure time of 10 minutes of more can be obtained even at a bending radius of 1.3 mm. In these cases, a temporary excessive bending strain can be relieved before the optical fiber fractures.

The factors A and B in the equation (1) showing the correlation between the average failure strength and the average failure time vary depending on drawing conditions, conditions for coating with resin, the resin composition, and the time elapsed from drawing. However, the present inventors have confirmed that when the OH concentration in a region in the vicinity of the outer circumference of the optical preform is 10 ppm to 10,000 ppm by weight, the primary coating 21, before being photo-cured, has a moisture content of 50 ppm to 20,000 ppm by weight, and the resin has a pH of 7 or less, the inequality (2) can be generally satisfied with a yield of 75% or more.

In the optical fiber 1, the OH concentration of the glass fiber 10 in the vicinity of the outer circumferential surface is preferably 10 ppm to 1,000 ppm by weight. In synthetic glass which does not contain an alkali metal, while a very small amount of OH does not directly affect glass failure, it can promote dehydration-condensation reaction between the surface layer of glass and a silane coupling agent, thus being desirable from the standpoint of increasing glass strength. However, when the OH concentration is excessively high, the stress intensity factor of microcracks increases, resulting in decreases in the failure strength and fatigue coefficient. Consequently, the OH concentration of the glass fiber 10 in the vicinity of the outer circumferential surface is preferably 1,000 ppm by weight or less. Specifically, the OH concentration of the glass fiber in a region extending from the outer circumference of the glass fiber inward to an inside diameter of 0.95 dl, where dl is the outside diameter of the glass fiber, is preferably 10 ppm to 1,000 ppm by weight.

There may be a case where it is difficult to detect the OH concentration in the vicinity of the outer circumferential surface of the glass fiber 10 because of low spatial resolution in a versatile method in which infrared absorption is used. Accordingly, management may be performed alternatively by measuring the OH concentration in the vicinity of the outer circumferential surface of the optical fiber preform before being drawn (e.g., a region extending from the outer circumference of the optical fiber preform inward to an inside diameter of 0.98D1, where D1 is the outside diameter of the optical fiber preform). In this case, since OH diffuses in the process of forming an optical fiber, the OH concentration in the outer circumferential surface of the optical fiber preform is preferably in a range of 10 ppm to 10,000 ppm by weight. More preferably, the OH concentration is 10 ppm to 1,500 ppm by weight.

As the optical fiber 1, an optical fiber with low bending loss, which has a refractive index profile of step type, W-type, or trench type may be suitably used. Furthermore, an optical fiber in which the refractive index is controlled by air holes or a group of microvoids may also be suitably used. In a trench-type optical fiber, the bending loss can be reduced while maintaining the same mode field diameter, which defines splicing loss, as that of a generally used single-mode fiber complying with G.652. Furthermore, by appropriately adjusting the refractive index profile, it is also possible to achieve an optical fiber having a low bending loss, for example, a transmission loss of 0.15 dB/turn or less at a wavelength of 1,550 nm, even with a small bending radius of 10 or 5 mm.

The optical fiber 1 is manufactured by a method described below. First, a core in which light is guided is produced by a vapor-phase glass synthesis process, such as VAD, OVD, MCVD, or PCVD, and a jacket layer is formed on the outer circumference of the core by VAD, OVDE, APVD, a rod-in-collapse process, or the like. Thereby, an optical fiber preform is produced. An intermediate optical cladding layer may be further disposed between the core and the jacket by VAD, OVD, MCVD, a rod-in-collapse process, or the like. The optical fiber preform thus produced is placed in a drawing tower, and the lower end thereof is heated to the working point or higher. The resulting molten glass (drop of glass) is appropriately drawn to spin an optical fiber. The spun optical fiber, with the outside diameter thereof being controlled, goes through dies for coating the optical fiber with a resin, a UV furnace for curing the resin, and the like to form a coated optical fiber, and the coated optical fiber is wound on a take-up bobbin.

In general, in the optical fiber 1, a fiber coating 20 is disposed on the outer circumference of the glass fiber 10. The fiber coating 20 has a two-layered structure including a primary coating 21 which prevents external force from being directly affected to the glass fiber 10 and a secondary coating 22 which prevents external flaws. Dies for the primary and secondary coatings may be arranged in series. Alternatively, one set of dies that supply two layers simultaneously may be used for coating. In this case, since the height of the drawing tower can be decreased, the construction cost of the drawing building can be decreased.

Furthermore, by arranging an apparatus that controls the cooling rate of the spun glass fiber 10 between the drawing furnace and the dies, the surface temperature of the glass fiber 10 can be controlled to a suitable temperature when the glass fiber 10 enters the dies. The Reynolds number of gas to be made to flow into the apparatus that controls the cooling rate is desirably as low as possible because swing due to occurrence of turbulence to be applied to the spun fiber is reduced. Furthermore, by controlling the cooling rate of the glass fiber, Rayleigh scattering can be reduced, and it is also possible to obtain an optical fiber having low transmission loss.

In the UV furnace for curing the resin, by feedback controlling the furnace inside temperature, in addition to the intensity of UV light, the curing rate of the resin can be appropriately controlled. As the UV furnace, a magnetron or UV LED is suitably used. In the case where an UV LED is used, since the light source itself does not generate heat, a mechanism that sends hot air into the furnace so that the inside temperature of the furnace becomes adequate is separately provided. Furthermore, the components detached from the resin adhere to the internal surface of the furnace tube of the UV furnace, and the power of UV light reaching the coating changes during drawing. Therefore, the degree of decrease in UV light power during drawing may be monitored in advance, and the UV light power may be adjusted according to the drawing time so that the power of UV light applied to the coating can be constant. Furthermore, UV light leaking from the furnace tube may be monitored, and control may be performed so that the power of UV light applied to the coating can be constant. Thereby, it is possible to obtain failure strength that is uniform over the entire length of the optical fiber.

In order to secure external flaw resistance, preferably, the secondary coating 22, among two layers of coating, is set to have an appropriate thickness. In general, the thickness of the secondary coating 22 is preferably 10 μm or more, and more preferably 20 μm or more.

In the optical fiber 1 thus produced and wound on the take-up bobbin, as necessary, the coating is colored. The optical fiber 1 is used as a end product, such as an optical cable or optical cord.

In the failure strength test, using an optical fiber before or after coloring, tensile strain is applied in an axial direction to the optical fiber under the environment of a temperature of 25° C. and a humidity of 50%, and the tensile strength at which the optical fiber fails is monitored. In the case where sliding in the axial direction occurs at the time of applying tensile strain to the optical fiber, the failure strength is desirably appropriately corrected. Although the length of the optical fiber to be used in the failure strength test may be changed according to the apparatus, the length is desirably in the range of 5 m to 30 m in terms of ease of testing. Measurement with a length of 25 m or 5 m is preferable.

The tensile testing speed is a ratio of elongation of the optical fiber per minute. In the case where the elongation per minute is 25 mm in a sample with a length of 25 m, the tensile testing speed is 1%/min. The average failure strength is defined as the tensile strength at which 50% of optical fibers fails when the failure strength test is performed on samples (N=15 or more). Although the case where the tensile testing speed is 1%/min is described in the embodiment described herein, the present invention is also applicable to the case where the tensile testing speed is 1%/min or more. However, when the tensile testing speed is high, there is a possibility that data repeatability may be lowered.

In the failure time measurement, using an optical fiber before or after coloring, the optical fiber is wound on a mandrel with a predetermined diameter and held under the environment of a temperature of 25° C. and a humidity of 50%, and the period of time from the finish of winding until failure occurs is monitored. The average failure time is defined as the period of time until 50% of optical fibers fails in measurement of the failure time on samples (N=15 or more). Although the case where the radius of the mandrel on which the optical fiber is wound is 1.3 mm is described in the embodiment described herein, the same arrangement is possible in the case where the radius of the mandrel is larger or smaller than 1.3 mm. However, by setting the radius of curvature to be 1.3 mm, which is one of the harshest practical bending radii, the failure time can be easily guaranteed.

Preferred embodiments of the optical fiber or the method of manufacturing an optical fiber according to the present invention will be described below. It is known that, when water is present, failure of glass is increased in the presence of stress. However, in ordinary synthetic glass, a very small amount of OH in the outer circumference of glass promotes dehydration-condensation reaction between the surface layer of glass and a silane coupling agent, and the glass strength can be rather increased. On the other hand, when the OH concentration is excessively high, the stress intensity factor of microcracks increases, resulting in decreases in the failure strength and fatigue coefficient. Consequently, the OH concentration is preferably 1,000 ppm by weight or less.

Furthermore, when the resin of the primary coating 21, before being photo-cured, has a moisture content of 50 ppm to 20,000 ppm by weight, and a pH of 7 or less, the reaction of the silane coupling agent can be promoted, the strength of glass can be increased, and the failure time when bent around a small radius can be extended. More preferably, the pH of the primary coating 21, after being photo-cured, is 5 or less. In order to adjust the OH concentration in the outer circumference of glass, a method may be used in which fire polishing is performed, using an oxyhydrogen burner, on an optical fiber preform before being drawn. In this case, by adjusting the oxygen flow rate, the hydrogen flow rate, the flow ratio, and the surface temperature of the preform, a desired OH concentration can be obtained. As the moisture content in a resin solution for the primary coating 21 is increased, the reaction of the silane coupling agent can be more promoted. However, when the moisture content is excessively large at 20,000 ppm by weight or more, curing of the resin solution occurs, which is not desirable. In such a manner, it is possible to obtain an optical fiber that satisfies the inequality (2) at a high yield, thus increasing economic efficiency.

Preferably, the rate of decrease in the amount of an unreacted silane coupling agent contained in the primary coating 21 is less than 0.1/7 days. Tetraethoxysilane in the resin of the primary coating 21, before being photo-cured, can be detected by gas chromatography. The unreacted tetraethoxysilane in the primary coating 21, after being photo-cured, can also be detected by gas chromatography. By performing detection by gas chromatography after extraction, a more accurate value can be obtained.

When the change in the amount of the unreacted silane coupling agent in the primary coating 21, after being photo-cured, is large, the silane coupling reaction may not proceed sufficiently, the failure strength may be low, and the failure time when bent around a small radius may be short in some cases. Furthermore, since the relationship between failure strength and failure time may shift, accurate control may become difficult. Accordingly, by selecting and using an optical fiber in which the rate of decrease in the amount of the unreacted silane coupling agent contained in the primary coating 21 is less than 0.1/7 days, it is possible to use only an optical fiber in which the silane coupling reaction has proceeded sufficiently, and it is possible to obtain an optical fiber that satisfies the inequality (2) at a high yield, thus increasing economic efficiency. More preferably, the rate of decrease is less than 0.05/7 days.

Preferably, the resin for forming the primary coating 21, before being photo-cured, contains 0.1% to 10% by weight of unreactive tetraethoxysilane to which an oligomer is not added and 0.001% by weight or less of an amine-based additive. The unreactive tetraethoxysilane is not incorporated into the skeleton of the resin and acts as a silane coupling agent that is reactive with the surface of glass. Furthermore, since the unreactive tetraethoxysilane is a low-molecular substance to which an oligomer is not added, a high mobility in the resin can be maintained, the coupling reaction rate can be increased, and the need for aging or the like after drawing can be relieved. The amount of unreactive tetraethoxysilane is more preferably 0.3% to 2% by weight. When the amount of unreactive tetraethoxysilane is 10% by weight or more, there is an increased concern that drawability may be degraded. Furthermore, by substantially excluding an amine-based additive, the amount of basic component in the primary coating 21 is not increased, and therefore, the intrinsic strength of glass is not decreased.

Preferably, the primary coating 21 has an elongation stress at failure of 1.5 MPa or more. By maintaining the elongation stress at failure of the primary coating 21 at 1.5 MPa or more, the resin layer does not fail when bent around a small radius, for example, with a bending radius of 1.3 mm, and mechanical reliability of the optical fiber can be maintained in actual use after installation. The elongation stress at failure of the primary coating is more preferably 2 MPa or more, and still more preferably 3 MPa or more.

Preferably, the resin for forming the primary coating 21, before being photo-cured, contains 5% to 15% by weight of an N-vinyl monomer; and after being photo-cured, the primary coating 21 has a Young's modulus of 0.2 MPa to 1 MPa, and the secondary coating 22 has a Young's modulus of 800 MPa or more. Furthermore, preferably, the primary coating 21, after being photo-cured, has a gel fraction in the range of 80% to 95%. By setting the N-vinyl monomer content at 5% to 15% by weight, the elongation stress at failure of the primary coating 21 can be maintained to be 1.5 MPa or more. More preferably, the N-vinyl monomer content is 7% to 12% by weight, and the elongation stress at failure is 3.0 MPa or more.

On the other hand, when a large amount of N-vinyl monomer is added, there may be a case where the Young's modulus is increased at the same time. An excessively high Young's modulus may result in transmission loss due to microbending, which is undesirable. By setting the N-vinyl monomer content in the primary coating 21 to be 15% by weight or less, setting the Young's modulus of the primary coating 21 to be 0.2 MPa to 1 MPa, and setting the Young's modulus of the secondary coating 22 MPa to be 800 MPa or more, it is possible to prevent an increase in transmission loss due to microbending at the same time. The Young's modulus can be adjusted by adjusting the drawing rate and the temperature in the UV light lamp. In this case, by setting the gel fraction of the primary coating 21 in the range of 80% to 95%, it is possible to stably obtain an optical fiber whose failure time is long at the time of being bent around a small radius.

Preferably, the outside diameter of the fiber coating is 210 µm or less, and the thickness of the secondary coating 22 is 10 µm or more. The outside diameter of a generally used coated optical fiber is 240 µm to 250 µm. By setting the outside diameter of a coated optical fiber to be 210 µm or less while satisfying the range of the inequality (2), wiring can be performed in a limited space. In this case, when the thickness w2 of the secondary coating 22 is set to be 10 µm or more, external flaws can be prevented, which is preferable. More preferably, the thickness w2 of the secondary coating 22 is 15 µm or more.

Preferably, the dynamic fatigue coefficient is 20 or more. By setting the dynamic fatigue coefficient to be 20 or more, not only failure at the time of being bent around a small radius can be prevented, but also long-term mechanical reliability can be secured. More preferably, the dynamic fatigue coefficient is 25 or more. Furthermore, preferably, compressive stress is imparted to the outer circumference. By imparting compressive stress to the outer circumference of the optical fiber, the bending strain applied to the optical fiber can be cancelled, and the failure strength can be significantly increased.

Tables I and II summarize the data of optical fiber samples A to N. In the tables, S1 represents the amount of the unreacted silane coupling agent in the primary coating 21 measured after three days from drawing. S7 represents the amount of the unreacted silane coupling agent in the primary coating 21 measured 7 days after the S1 measurement date.

TABLE I

| | | Unit | A | B | C | D | E | F |
|---|---|---|---|---|---|---|---|---|
| UV furnace inside temperature | | [° C.] | 72 | 69 | 71 | 71 | 50 | 48 |
| Entrance temperature | | [° C.] | 65 | 62 | 59 | 60 | 59 | 58 |
| Maximum OH concentration in outer circumferential region of optical fiber glass with 0.95d1 to d1 | | [wt_ppm] | 800 | 780 | 720 | 920 | 800 | 780 |
| Maximum OH concentration in outer circumferential region of optical fiber preform with 0.95D1 to D1 | | [wt_ppm] | 6500 | 3800 | 3700 | 5800 | 6000 | 4500 |
| Outside diameter of fiber glass d1 | | [µm] | 125 | 125 | 125 | 125 | 125 | 125 |
| Thickness of primary coating w1 | | [µm] | 40 | 40 | 40 | 40 | 40 | 40 |
| Thickness of secondary coating w2 | | [µm] | 20 | 20 | 20 | 20 | 20 | 20 |
| Before curing (evaluation value of sample) | Moisture in primary coating | [wt_ppm] | 2000 | 2000 | 2000 | 2000 | 2000 | 2000 |
| | N-vinyl monomer (evaluation value of sample) | [wt_ppm] | 5 | 5 | 5 | 8 | 10 | 12 |
| | Tetraethoxysilane (evaluation value of sample) | [wt %] | 0.8 | 0.8 | 1.5 | 1.8 | 0.8 | 0.8 |
| | Amine-based additive (evaluation value of sample) | [wt %] | n.d. | n.d. | n.d. | n.d. | n.d. | n.d. |
| After curing | Young's modulus of primary coating | [MPa] | 0.58 | 0.62 | 0.62 | 0.57 | 0.78 | 0.82 |
| | Young's modulus of secondary coating | [MPa] | 1220 | 1200 | 1250 | 1180 | 1220 | 1200 |

TABLE I-continued

|  | Unit | A | B | C | D | E | F |
|---|---|---|---|---|---|---|---|
| Gel fraction | [%] | 88 | 92 | 91 | 90 | 87 | 86 |
| pH |  | 4.7 | 4.7 | 4.7 | 4.7 | 4.7 | 4.7 |
| Elongation stress at failure | [MPa] | 1.8 | 2 | 2.4 | 3.1 | 3.2 | 3.3 |
| S7/S1 |  | 0.92 | 0.91 | 0.93 | 0.92 | 0.92 | 0.91 |
| Average failure strength at tensile testing speed of 1%/min (N = 15), F | [kgf] | 5.7 | 5.9 | 5.6 | 6.1 | 5.8 | 6 |
| Average failure time R1.3 mm (N = 15), T | [min] | 31 | 40 | 45 | 230 | 33 | 66 |
| Satisfying or not satisfying $T > 2.6 \times 10^{-11} \exp(4.736 \times F)$ |  | Satisfying | Satisfying | Satisfying | Satisfying | Satisfying | Satisfying |
| R5 mm bending loss@ $\lambda$ = 1550 nm | [dB/turn] | 0.05 | 0.4 | 0.045 | 0.4 | 0.06 | 0.4 |
| R7.5 mm bending loss@ $\lambda$ = 1550 nm | [dB/turn] | 0.01 | 0.09 | 0.01 | 0.08 | 0.009 | 0.085 |
| R10 mm bending loss@ $\lambda$ = 1550 nm | [dB/turn] | 0.0025 | 0.008 | 0.0025 | 0.008 | 0.0023 | 0.008 |
| R15 mm bending loss@ $\lambda$ = 1550 nm | [dB/turn] | 0.00005 | 0.00018 | 0.00006 | 0.00018 | 0.00004 | 0.00018 |

TABLE II

|  |  | Unit | G | H | I | J |
|---|---|---|---|---|---|---|
| UV furnace inside temperature |  | [° C.] | 72 | 69 | 50 | 48 |
| Entrance temperature |  | [° C.] | 59 | 58 | 59 | 58 |
| Maximum OH concentration in outer circumferential region of optical fiber glass with 0.95d1 to d1 |  | [wt_ppm] | 2 | 5 | 2 | 3 |
| Maximum OH concentration in outer circumferential region of optical fiber preform with 0.95D1 to D1 |  | [wt_ppm] | 7 | 9 | 8 | 9 |
| Outside diameter of fiber glass d1 |  | [µm] | 125 | 125 | 125 | 125 |
| Thickness of primary coating w1 |  | [µm] | 42 | 40 | 45 | 40 |
| Thickness of secondary coating w2 |  | [µm] | 18 | 20 | 15 | 20 |
| Before curing (evaluation value of sample) | Moisture in primary coating | [wt_ppm] | 30 | 28 | 40 | 45 |
|  | N-vinyl monomer | [wt_ppm] | 5 | 5 | 5 | 5 |
|  | Tetraethoxysilane | [wt %] | 0.02 | 0.8 | 0.8 | 0.8 |
|  | Amine-based additive | [wt %] | n.d. | n.d. | n.d. | n.d. |
| After curing | Young's modulus of primary coating | [MPa] | 0.58 | 0.62 | 0.78 | 0.82 |
|  | Young's modulus of secondary coating | [MPa] | 1220 | 1200 | 1220 | 1200 |
|  | Gel fraction | [%] | 88 | 92 | 87 | 86 |
|  | pH |  | 4.7 | 4.7 | 4.7 | 4.7 |
|  | Elongation stress at failure | [MPa] | 1.8 | 2 | 1.8 | 2 |
|  | S7/S1 |  | 0.92 | 0.91 | 0.92 | 0.91 |
| Average failure strength at tensile testing speed of 1%/min (N = 15), F |  | [kgf] | 5.3 | 5.4 | 5.3 | 5.45 |
| Average failure time R1.3 mm (N = 15), T |  | [min] | 0.8 | 2 | 1.5 | 2.8 |
| Satisfying or not satisfying $T > 2.6 \times 10^{-11} \exp$ |  |  | not satisfying | not satisfying | not satisfying | not satisfying |
| R5 mm bending loss@ $\lambda$ = 1550 nm |  | [dB/turn] | 0.05 | 0.045 | 0.05 | 0.045 |
| R7.5 mm bending loss@ $\lambda$ = 1550 nm |  | [dB/turn] | 0.01 | 0.009 | 0.01 | 0.01 |
| R10 mm bending loss@ $\lambda$ = 1550 nm |  | [dB/turn] | 0.0025 | 0.0025 | 0.0025 | 0.0023 |
| R15 mm bending loss@ $\lambda$ = 1550 nm |  | [dB/turn] | 0.00005 | 0.00004 | 0.00005 | 0.00006 |

|  |  | Unit | K | L | M | N |
|---|---|---|---|---|---|---|
| UV furnace inside temperature |  | [° C.] | 72 | 69 | 50 | 48 |
| Entrance temperature |  | [° C.] | 59 | 58 | 59 | 58 |
| Maximum OH concentration in outer circumferential region of optical fiber glass with 0.95d1 to d1 |  | [wt_ppm] | 2300 | 2200 | 2050 | 1400 |
| Maximum OH concentration in outer circumferential region of optical fiber preform with 0.95D1 to D1 |  | [wt_ppm] | 15000 | 18000 | 20100 | 10000 |
| Outside diameter of fiber glass d1 |  | [µm] | 125 | 125 | 125 | 125 |
| Thickness of primary coating w1 |  | [µm] | 42 | 40 | 45 | 40 |
| Thickness of secondary coating w2 |  | [µm] | 18 | 20 | 15 | 20 |
| Before curing (evaluation value of sample) | Moisture in primary coating | [wt_ppm] | 32 | 42 | 55 | 72 |
|  | N-vinyl monomer | [wt_ppm] | 5 | 5 | 5 | 5 |
|  | Tetraethoxysilane | [wt %] | 0.8 | 0.8 | 0.8 | 0.8 |
|  | Amine-based additive | [wt %] | n.d. | n.d. | n.d. | n.d. |
| After curing | Young's modulus of primary coating | [MPa] | 0.59 | 0.63 | 0.75 | 0.72 |
|  | Young's modulus of secondary coating | [MPa] | 900 | 950 | 1020 | 1050 |
|  | Gel fraction | [%] | 88 | 92 | 87 | 86 |
|  | pH |  | 4.7 | 4.7 | 4.7 | 4.7 |
|  | Elongation stress at failure | [MPa] | 1.8 | 2 | 1.8 | 2 |
|  | S7/S1 |  | 0.92 | 0.91 | 0.92 | 0.91 |
| Average failure strength at tensile testing speed of 1%/min (N = 15), F |  | [kgf] | 5.2 | 5.3 | 5.4 | 5.6 |
| Average failure time R1.3 mm (N = 15), T |  | [min] | 0.8 | 1.8 | 1.5 | 2.8 |

TABLE II-continued

| | | | | | |
|---|---|---|---|---|---|
| Satisfying or not satisfying $T > 2.6 \times 10^{-11}$ exp $(4.736 \times F)$ | | not satisfying | not satisfying | not satisfying | not satisfying |
| R5 mm bending loss@ $\lambda$ = 1550 nm | [dB/turn] | 0.05 | 0.045 | 0.05 | 0.045 |
| R7.5 mm bending loss@ $\lambda$ = 1550 nm | [dB/turn] | 0.01 | 0.009 | 0.01 | 0.01 |
| R10 mm bending loss@ $\lambda$ = 1550 nm | [dB/turn] | 0.0025 | 0.0025 | 0.0025 | 0.0023 |
| R15 mm bending loss@ $\lambda$ = 1550 nm | [dB/turn] | 0.00005 | 0.00004 | 0.00005 | 0.00006 |

Regarding the optical fiber samples A to N, first, the rate of decrease in the amount of the silane coupling agent (1-S7/S1) was confirmed to be less than 0.1/7 days. Then, an average failure strength F1 [kgf] and an average failure time T [min] were measured once on a string of optical fiber (parent optical fiber) drawn from one optical fiber preform, and it was determined whether or not the failure strength F1 [kgf] and the failure time T [min] satisfied the inequality $T>2.6\times10^{-11}\times\exp(4.736\times F1)$. Regarding the parent optical fibers determined to be satisfying (0), the failure strength was evaluated again on individual optical fibers cut from the parent fibers. Regarding the optical fibers in which F≥5.5 kgf, it was confirmed that the failure time was sufficient for withstanding temporary sharp bending (e.g., with R 1.3 mm) for 10 minutes for more at a yield of 99% or more. Regarding the optical fibers in which F<5.5 kgf, it was confirmed that the yield in which T was 10 minutes or more was low at 16%.

What is claimed is:

1. A method of manufacturing an optical fiber, which is a method of manufacturing an optical fiber having a fiber coating on the outer circumference of a glass fiber, comprising:
    a first step of drawing an optical fiber preform into a glass fiber and disposing a fiber coating on the outer circumference of the glass fiber to form a parent optical fiber;
    a second step of cutting the parent optical fiber into a plurality of individual optical fibers;
    a third step of determining, at, at least, one spot of the parent optical fiber, a failure strength F1, which is a tension at which the parent optical fiber fails when the tension of the parent optical fiber is increased at a tensile testing speed of 1%/min, and a failure time T, which is a period of time until the parent optical fiber wound on a mandrel with a radius of 1.3 mm fails;
    a fourth step of determining a failure strength F2 of each of the plurality of individual optical fibers; and
    a fifth step of selecting an optical fiber having a failure strength F2 of 5.5 kgf or more from the individual optical fibers cut from the parent optical fiber whose failure strength F1 [kgf] and failure time T [min] satisfy the inequality $T>2.6\times10^{-11}\times\exp(4.736\times F1)$.

2. The method of manufacturing an optical fiber according to claim 1, wherein the OH concentration of the optical fiber preform in a region extending from the outer circumference of the optical fiber preform inward to an inside diameter of 0.98D1, where D1 is the outside diameter of the optical fiber preform, is 10 ppm to 10,000 ppm by weight; and
    a resin for forming a primary coating which is a part of the fiber coating and is in contact with the outer circumference of the glass fiber, before being photo-cured, has a moisture content of 50 ppm to 20,000 ppm by weight, and a pH of 7 or less.

3. The method of manufacturing an optical fiber according to claim 1, wherein, in the third step, the rate of decrease in the amount of an unreacted silane coupling agent contained in a primary coating which is a part of the fiber coating and is in contact with the outer circumference of the glass fiber is less than 0.1/7 days.

4. The method of manufacturing an optical fiber according to claim 1, wherein
    a resin for forming a primary coating which is a part of the fiber coating and is in contact with the outer circumference of the glass fiber, before being photo-cured, contains 0.1% to 10% by weight of unreactive tetraethoxysilane to which an oligomer is not added and 0.001% by weight or less of an amine-based additive.

5. The method of manufacturing an optical fiber according to claim 4, wherein the resin for forming a primary coating which is a part of the fiber coating and is in contact with the outer circumference of the glass fiber, before being photo-cured, contains 0.3% to 2% by weight of unreactive tetraethoxysilane to which an oligomer is not added.

6. The method of manufacturing an optical fiber according to claim 1, wherein a primary coating which is a part of the fiber coating and is in contact with the outer circumference of the glass fiber, after being photo-cured, has an elongation stress at failure of 1.5 MPa or more.

7. The method of manufacturing an optical fiber according to claim 1, wherein a resin for forming a primary coating which is a part of the fiber coating and is in contact with the outer circumference of the glass fiber, before being photo-cured, contains 5% to 15% by weight of an N-vinyl monomer; and after being photo-cured, the primary coating has a Young's modulus of 0.2 MPa to 1 MPa, and a secondary coating surrounding the primary coating has a Young's modulus of 800 MPa or more.

8. An optical fiber comprising a fiber coating disposed on the outer circumference of a gass fiber, wherein
    a failure strength F [kgf], which is a tension at which the optical fiber fails when the tension is increased at a tensile testing speed of 1%/min, and a failure time T [min], which is a period of time until the optical fiber wound on a mandrel with a radius of 1.3 mm fails, satisfy the inequalities $T>2.6\times10^{-11}\times\exp(4.736\times F)$ and $F>5.5$.

9. An optical fiber according to claim 8, wherein the OH concentration of the glass fiber in a region extending from the outer circumference of the glass fiber inward to an inside diameter of 0.95 dl, where dl is the outside diameter of the glass fiber, is 10 ppm to 1,000 ppm by weight.

10. The optical fiber according to claim 9, wherein
    a resin for forming a primary coating which is a part of the fiber coating and is in contact with the outer circumference of the glass fiber has a moisture content of 50 ppm to 20,000 ppm by weight before being photo-cured, and a pH of 5 or less after being photo-cured.

11. The optical fiber according to claim 9, wherein the rate of decrease in the amount of an unreacted silane coupling agent contained in a primary coating which is a part of the fiber coating and is in contact with the outer circumference of the glass fiber is less than 0.1/7 days.

12. The optical fiber according to claim 9, wherein
    a primary coating which is a part of the fiber coating and is in contact with the outer circumference of the glass fiber, after being photo-cured, has an elongation stress at failure of 1.5 MPa or more.

13. The optical fiber according to claim 9, wherein
a primary coating which is a part of the fiber coating and is in contact with the outer circumference of the glass fiber, after being photo-cured, has a gel fraction in the range of 80% to 95%.

14. The optical fiber according to claim 9, wherein
the outside diameter of the fiber coating is 210 μm or less, and the thickness of a secondary coating is 10 μm or more.

15. The optical fiber according to claim 9, wherein
the dynamic fatigue coefficient is 20 or more.

16. The optical fiber according to claim 9, wherein
compressive stress is imparted to the outer circumference.

* * * * *